(12) United States Patent
Joesph et al.

(10) Patent No.: US 12,405,490 B2
(45) Date of Patent: Sep. 2, 2025

(54) DISPLAY DEVICE AND MEANS OF TRANSPORTATION

(71) Applicant: Continental Automotive Technologies GmbH, Hannover (DE)

(72) Inventors: Manrico Joesph, Ober-Ramstadt (DE); Oliver Jakoby, Heusenstamm (DE); Sait Kalender, Darmstadt (DE); Jörg Thomas, Dietzenbach (DE); Martin Thomas Nowak, Singapore (SG); Kerstin Thiel, Hannover (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/761,842

(22) Filed: Jul. 2, 2024

(65) Prior Publication Data
US 2025/0013079 A1  Jan. 9, 2025

(30) Foreign Application Priority Data

Jul. 3, 2023  (DE) ..................... 10 2023 206 277.1

(51) Int. Cl.
*G02F 1/01*  (2006.01)
*B60K 35/22*  (2024.01)
*F21V 8/00*  (2006.01)

(52) U.S. Cl.
CPC ............ *G02F 1/0105* (2013.01); *B60K 35/22* (2024.01); *G02B 6/0031* (2013.01); *G02B 6/0068* (2013.01); *G02B 6/0073* (2013.01); *B60K 2360/23* (2024.01); *B60K 2360/332* (2024.01)

(58) Field of Classification Search
CPC . G02F 1/0105; B60K 35/22; B60K 2360/332; B60K 2360/23; G02B 6/0031; G02B 6/0068; G02B 6/0073
See application file for complete search history.

(56) References Cited

U.S. PATENT DOCUMENTS

| 6,914,651 | B1 | 7/2005 | Fujishiro |
| 2005/0138852 | A1 | 6/2005 | Yamauchi |
| 2008/0111948 | A1 | 5/2008 | Epstein et al. |

(Continued)

FOREIGN PATENT DOCUMENTS

| CN | 115016175 A | 9/2022 |
| DE | 102007007353 A1 | 8/2008 |

(Continued)

OTHER PUBLICATIONS

Office Action dated Feb. 8, 2024 from corresponding German patent application No. 10 2023 206 277.1.

(Continued)

*Primary Examiner* — Mary Ellen Bowman
(74) *Attorney, Agent, or Firm* — COZEN O'CONNOR

(57) ABSTRACT

The present disclosure relates to a display device and to a means of transportation having such a display device. The display device comprises a display panel and a backlight for the display panel. The backlight comprises a reflector having a multiplicity of reflectively configured cavities. In addition, the backlight comprises a multiplicity of light sources arranged in each case in the cavities. Walls of the cavities are configured such that a grid structure of the reflector resulting from the arrangement of the cavities is broken up.

8 Claims, 4 Drawing Sheets

(56) References Cited

U.S. PATENT DOCUMENTS

| | | | |
|---|---|---|---|
| 2010/0061087 A1* | 3/2010 | Stevens | G02F 1/133605 |
| | | | 362/97.3 |
| 2014/0183571 A1 | 7/2014 | Lee et al. | |
| 2018/0033991 A1 | 2/2018 | Yamashita | |
| 2018/0372300 A1 | 12/2018 | Ohkawa | |
| 2020/0287109 A1 | 9/2020 | Chang et al. | |
| 2022/0308272 A1* | 9/2022 | Hashimoto | G02B 5/09 |

FOREIGN PATENT DOCUMENTS

| | | |
|---|---|---|
| EP | 2191521 B1 | 10/2018 |
| JP | 2011060706 A | 3/2011 |
| KR | 20100061686 A | 6/2010 |
| KR | 20170051645 A | 5/2017 |
| KR | 20180062573 A | 6/2018 |
| WO | 2011125010 A1 | 10/2011 |

OTHER PUBLICATIONS

Extended EP Search Report dated Nov. 4, 2024 from corresponding European patent application No. 24174006.7.
Request for the Submission of an Opinion dated Jan. 17, 2025 from corresponding Korean patent application No. 10-2024-0079037.

\* cited by examiner

DISPLAY DEVICE AND MEANS OF TRANSPORTATION

CROSS REFERENCE TO RELATED APPLICATIONS

This US patent application claims the benefit of German patent application No. 10 023 206 277.1, filed Jul. 3, 2023, which is hereby incorporated by reference.

TECHNICAL FIELD

The present disclosure relates to a display device and to a means of transportation having such a display device.

BACKGROUND

The number and area of display devices in means of transportation are constantly increasing. Display devices can be found on the market for example as an instrument cluster for the driver, as a central display, and also as a front-seat passenger display. Non-luminous transmissive display devices require a backlight to present images. The task of the backlight is here to illuminate the display panel used as uniformly as possible over the entire active surface in order to produce a display that is as homogeneous as possible right up to the peripheral region.

Matrix backlights utilize a multiplicity of light sources arranged in a matrix for light generation. The light from the light sources is steered here in the direction of the display panel by means of a reflector.

For instance, US 2020/0287109 A1 describes a backlight for a display panel. The backlight comprises a reflector having a multiplicity of regularly shaped, reflectively configured cavities arranged in a grid. The height of the reflector decreases toward the corners of the cavities.

DE 10 2007 007 353 A1 describes an illumination apparatus having a light emission surface that is able to be assembled in modular fashion from a multiplicity of radiation reflectors. Radiation reflectors in the shape of honeycombs, scales, triangles or rectangles are preferably used. Each of the radiation reflectors comprises a plurality of radiation-reflecting surfaces that are outwardly curved starting from a center in which a light source is arranged.

In practice, it was found that the currently available backlights achieve a relatively uniform lighting of the display panel but leave grid structures that are identifiable by the human eye in the lighting. The observer perceives these as bothersome.

SUMMARY

It is an object of the disclosure to provide an improved display device having a matrix backlight.

This object is achieved by a display device having the features of claim 1 and by a means of transportation as claimed in claim 10. Preferred configurations of the disclosure are the subject matter of the dependent claims.

According to a first aspect of the disclosure, a display device comprises a display panel and a backlight for the display panel, the backlight comprising a reflector having a multiplicity of reflectively configured cavities, with walls of the cavities being configured such that a grid structure of the reflector resulting from the arrangement of the cavities is broken up, and a multiplicity of light sources arranged in each case in the cavities.

In the solution according to the disclosure, a reflector is arranged between the light sources and the display panel and fills the design-related gap between the light sources and the display panel or a further optical component arranged below the display panel. This reflector comprises a multiplicity of reflectively configured cavities, in each of which at least one light source is arranged. The cavities orient the light emerging from the light sources toward the display panel. The walls of the cavities are configured such that no regular grid structure of the reflector is able to be identified by an observer of the display device. To achieve this, the walls of the cavities or the upper edges of the cavities as viewed by the observer are configured such that long, crossing straight lines are avoided. As a result, the human eye is unable to adapt the individual lines to form a bothersome long straight line. Numerous technologies are available for the production of the reflector. For instance, the reflector can be realized as a plastics component produced by injection molding, as a silicone component, or as a shaped film.

According to one aspect of the disclosure, adjacent cavities each have a different configuration. In this embodiment, adjoining cavities each have a different shape. In the process, a plurality of cavities, e.g., 2×2 cavities, may form a block. Then, the reflector may comprise a multiplicity of such blocks. This reduces the required outlay with regard to the reflector design.

According to one aspect of the disclosure, the upper edges of the cavities as viewed by the observer form irregular polygons. In this embodiment, the cavities are formed by polygons, e.g., by pentagons, so that continuous or long straight lines are avoided by design. Although the upper edges of the cavities have numerous straight portions here, and these may also extend over more than one cavity, they are not perceived as continuous straight lines by the eye of the observer.

According to one aspect of the disclosure, the upper edges of the cavities as viewed by the observer have a curved profile. As a result of such a curved profile, straight lines that are perceivable by the eye can be entirely avoided.

According to one aspect of the disclosure, the cavities are nested in one another. The cavities may be nested in one another like a puzzle, especially in the case of a curved profile of the upper edges of the cavities. An advantage thereof is that all cavities may have the same shape, possibly apart from an edge region of the reflector, but an adaptation of the upper edges of the cavities to form lines or a grid for the human eye is nevertheless much impeded.

According to one aspect of the disclosure, the light sources have a regular arrangement. A regular arrangement of the light sources, for example in a regular dot matrix or in a plurality of regular lines, facilitates the design of a printed circuit board on which the light sources are arranged. Moreover, a calculation of the control signals for the light sources required for a homogeneous lighting of the display panel is facilitated.

According to one aspect of the disclosure, walls of the cavities are rounded and the cavities are configured to reflect the light emitted by the light sources toward the display panel. Due to the rounding, the emitted light may be reflected toward the display panel in a more targeted manner.

According to one aspect of the disclosure, the light sources are side-emitting light-emitting diodes. The use of side-emitting light-emitting diodes has the advantage that the formation of light spots in the backlight is prevented. This ensures illumination of the display panel that appears particularly homogeneous.

According to one aspect of the disclosure, the side-emitting light-emitting diodes emit light on all sides. This ensures an additional increase in the homogeneity of the lighting of the display panel.

A display device according to the disclosure is preferably used in transportation. The transportation may be, for example, a motor vehicle but alternatively also an aircraft, a rail vehicle, or a watercraft.

BRIEF DESCRIPTION OF THE DRAWINGS

Further features of the present disclosure will become apparent from the following description and the appended claims in conjunction with the figures, wherein:

DETAILED DESCRIPTION

For a better understanding of the principles of the present disclosure, embodiments of the invention are explained in more detail below with reference to the figures. Identical reference signs are used for identical or functionally identical elements in the figures and are not necessarily described again for each figure. It goes without saying that the disclosure is not restricted to the embodiments represented and that the features described may also be combined or modified without departing from the scope of protection of the disclosure as defined in the appended claims.

Figure 1:
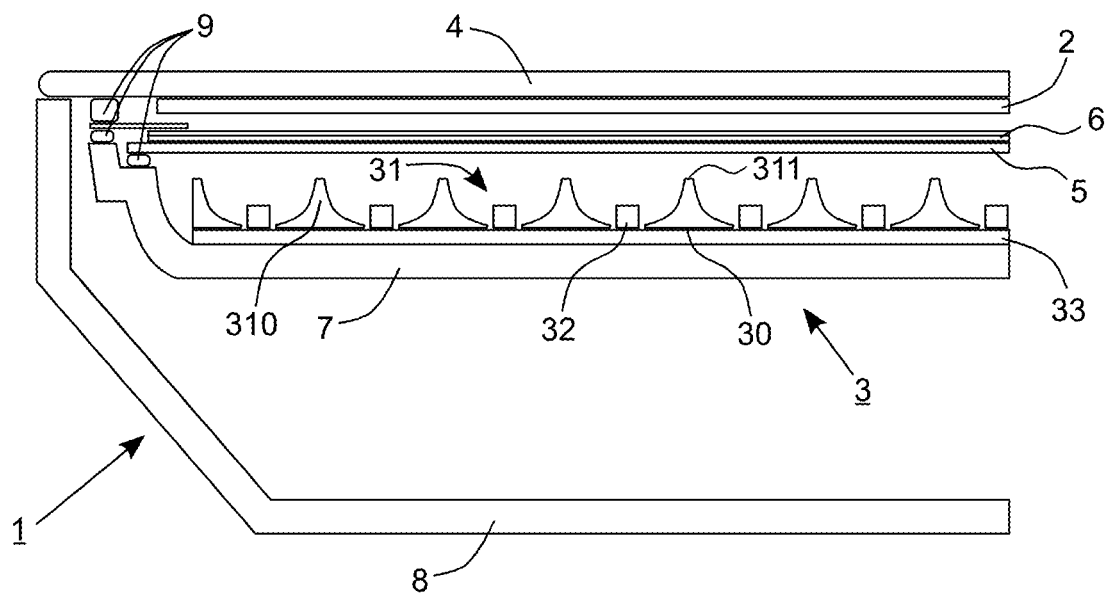
FIG. 1 schematically shows a cross section of a display device.

FIG. 1 schematically shows a cross section of a display device 1. The display device 1 comprises a display panel 2, which is adhesively bonded to a cover glass 4. The cover glass 4 closes off a housing 8 of the display device 1 with respect to the environment. A backlight 3 for the display panel 2 is arranged in a further housing 7. The backlight 3 comprises a reflector 30 having a multiplicity of cavities 31. The walls 310 of the cavities 31 or the upper edges 311 of the cavities 31 as viewed by the observer are configured such that long, crossing straight lines are avoided, and no regular grid structure of the reflector 30 is able to be identified by an observer of the display device 1. One light source 32, typically a light-emitting diode, is arranged in each of the cavities 31. The light sources 32 are arranged on a printed circuit board 33, which may be adhesively bonded to the housing 7 of the backlight 3. In the illustrated example, an optical plate 5 having an optical film stack 6 arranged thereon is located between the backlight 3 and the display panel 2. The films of the optical film stack 6 are intended to scatter, collect, or direct the light from the reflector 30 in a way such that the requirements regarding the solid angles of the backlight 3 are met. Typical films for light orientation are brightness enhancement films (BEFs) and light control films (LCFs). The optical plate 5 is a transparent plate that ensures the optical distance between the optical film stack 6 and the light sources 32. The cover glass 4, the optical plate 5, and the housing 7 of the backlight 3 are connected to one another by suitable connecting elements 9, e.g., adhesive bonds.

Figure 2:
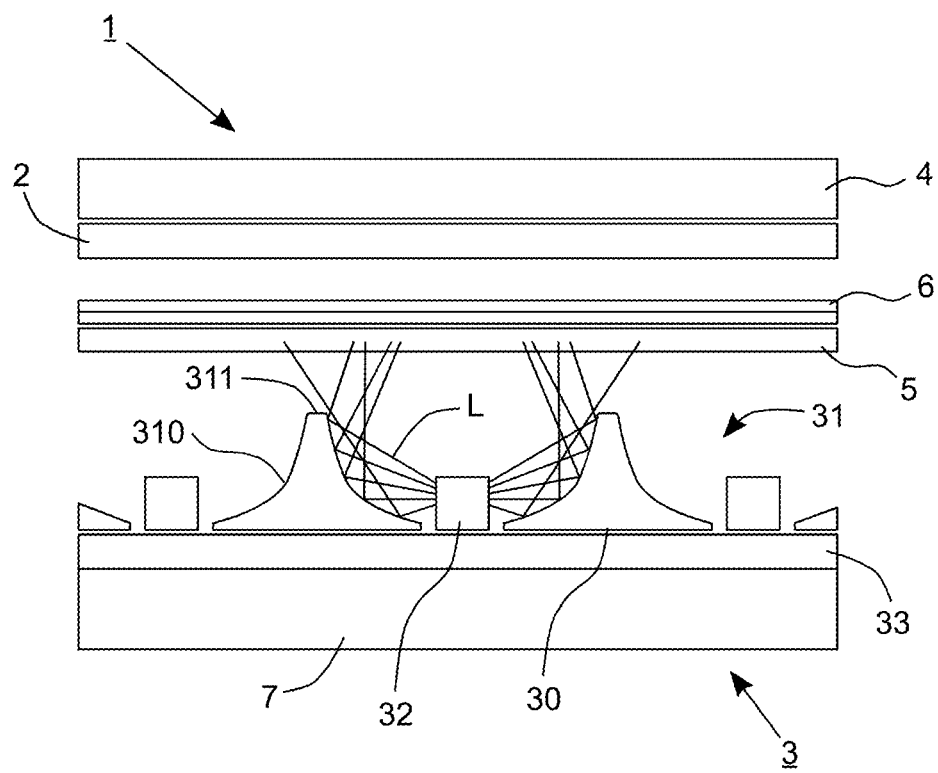
FIG. 2 schematically shows a detailed view of the display device.

FIG. 2 schematically shows a detailed view of the display device 1. It shows the cover glass 4 with the display panel 2, the optical plate 5 with the optical film stack 6, and the backlight 3 with the housing 7, the printed circuit board 33 with the light sources 32 arranged thereon, and the reflector 30. The light sources 32 in this case are side-emitting light-emitting diodes, which preferably emit light L on all sides. The reflectively configured walls 310 of the cavities 31 of the reflector 30 have a rounded configuration and orient the light L emerging from the light sources 32 toward the display panel 2. In one configuration, the entire construction height of the display device 1 preferably lies in the region of ~13.3 mm. The height of the reflector 30 may be ~3.72 mm, the width of the walls 33 at their widest point may be ~6.13 mm. The distance between the film stack 6 and the display panel 2 is, e.g., ~1.31 mm; the distance between the reflector 30 and the optical plate 5 can be ~1.05 mm. The distance between the light sources 32 may be, e.g., ~9.13 mm.

Figure 3:
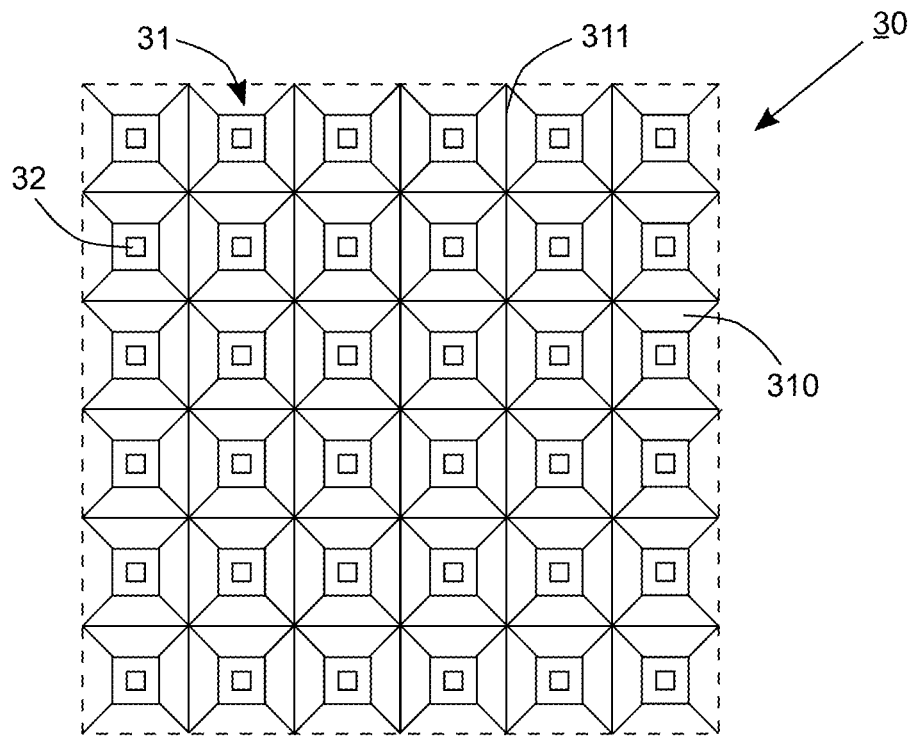
FIG. 3 schematically shows a reflector of a known display device.

FIG. 3 schematically shows a reflector 30 of a known display device. The reflector 30 comprises a plurality of cavities 31, in each of which a light source 32 is arranged. The cavities 31 have a regular shape and are arranged in a regular grid. The walls 310 of the cavities 31 or the upper edges 311 of the cavities 31 in each case form a square. A regular grid structure made of long crossing lines emerges from the arrangement and shape of the cavities 31. The observer perceives this grid structure as bothersome.

Figure 4:
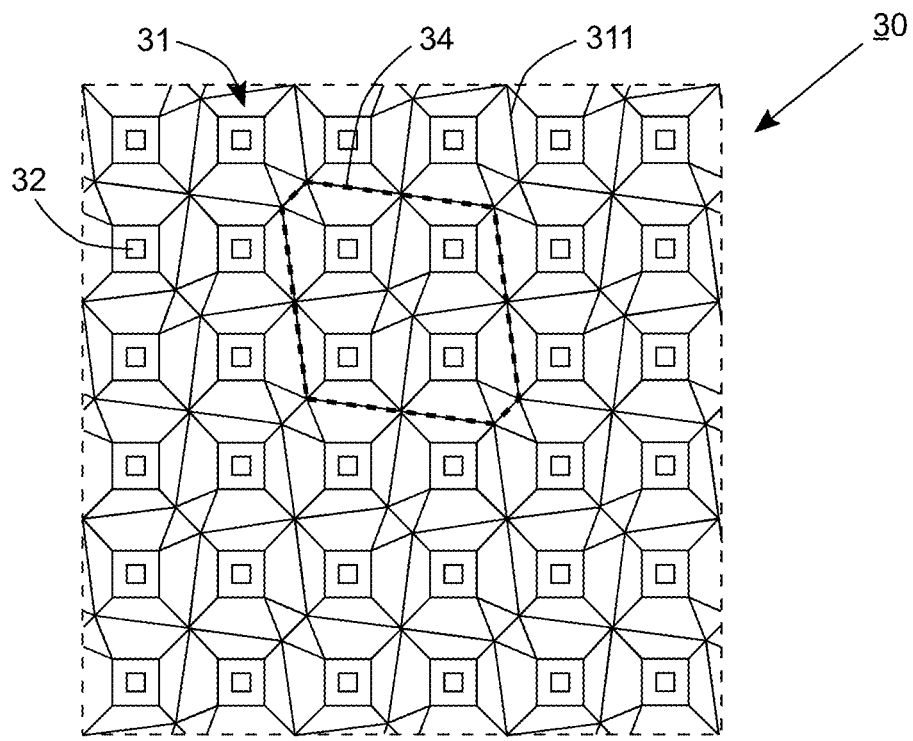
FIG. 4 schematically shows a first embodiment of a reflector of a display device according to the disclosure.

FIG. 4 schematically shows a first embodiment of a reflector 30 of a display device according to the disclosure. In this embodiment, adjacent cavities 31 each have a different configuration. This breaks up the regular grid structure of the reflector 30; i.e., no regular grid structure is able to be identified by the observer of the display device. In the depicted example, the upper edges 311 of the cavities 31 as viewed by the observer form irregular polygons, irregular pentagons in this case. Although straight lines occur, they extend here over no more than two cavities 31. Four respective cavities 31 form a block 34; the block is indicated here by a dashed line. The reflector 30 comprises a multiplicity of such blocks 34. It is easily identifiable that the light sources 32 have a regular arrangement. In this case, the light sources 32 are arranged in a regular dot matrix.

Figure 5:
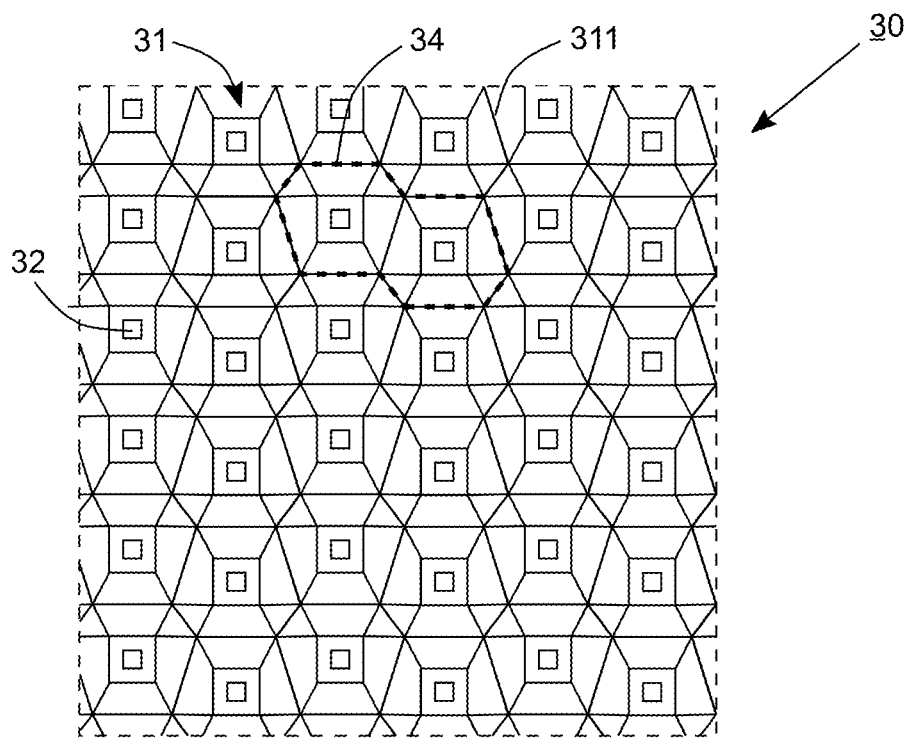
FIG. 5 schematically shows a second embodiment of a reflector of a display device according to the disclosure.

FIG. 5 schematically shows a second embodiment of a reflector 30 of a display device according to the disclosure. In this embodiment, too, adjacent cavities 31 each have a different configuration. In the depicted example, the upper edges 311 of the cavities 31 as viewed by the observer form irregular hexagons. Although straight lines occur, they extend here over no more than one cavity 31. Two respective cavities 31 form a block 34; the block is indicated here by a dashed line. Once again, the light sources 32 have a regular arrangement. However, the light sources 32 are not arranged in a regular dot matrix in this case; instead, they are arranged in a plurality of regular lines.

Figure 6:
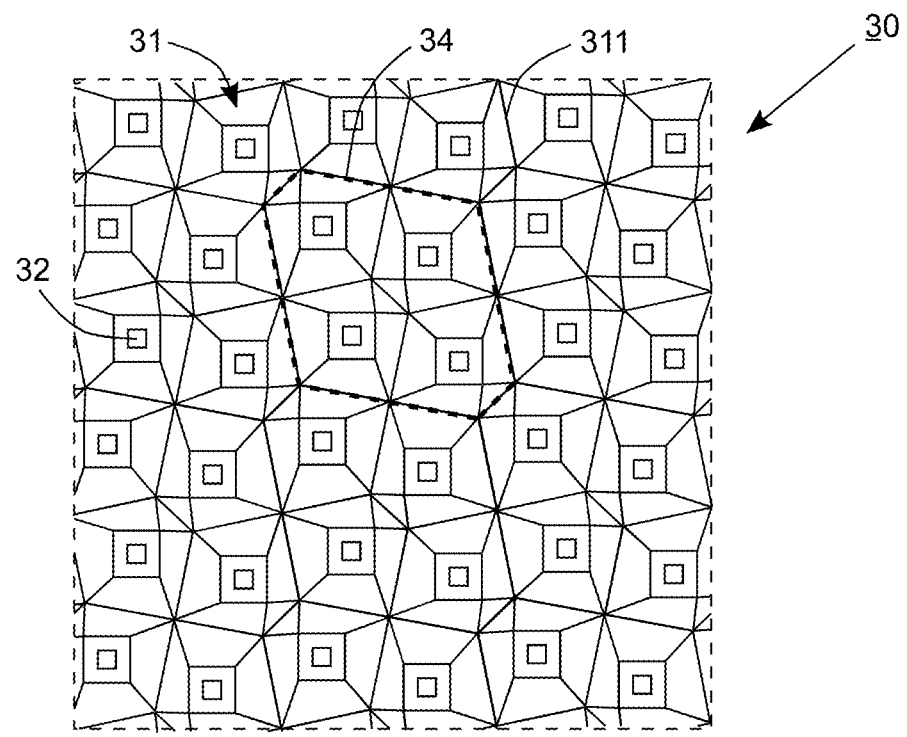
FIG. 6 schematically shows a third embodiment of a reflector of a display device according to the disclosure.

FIG. 6 schematically shows a third embodiment of a reflector 30 of a display device according to the disclosure. As previously, adjacent cavities 31 each have a different configuration. The upper edges 311 of the cavities 31 as viewed by the observer form irregular pentagons in each case, with four respective cavities 31 forming a block. Once again, the light sources 32 have a regular arrangement in a plurality of regular lines.

Figure 7:
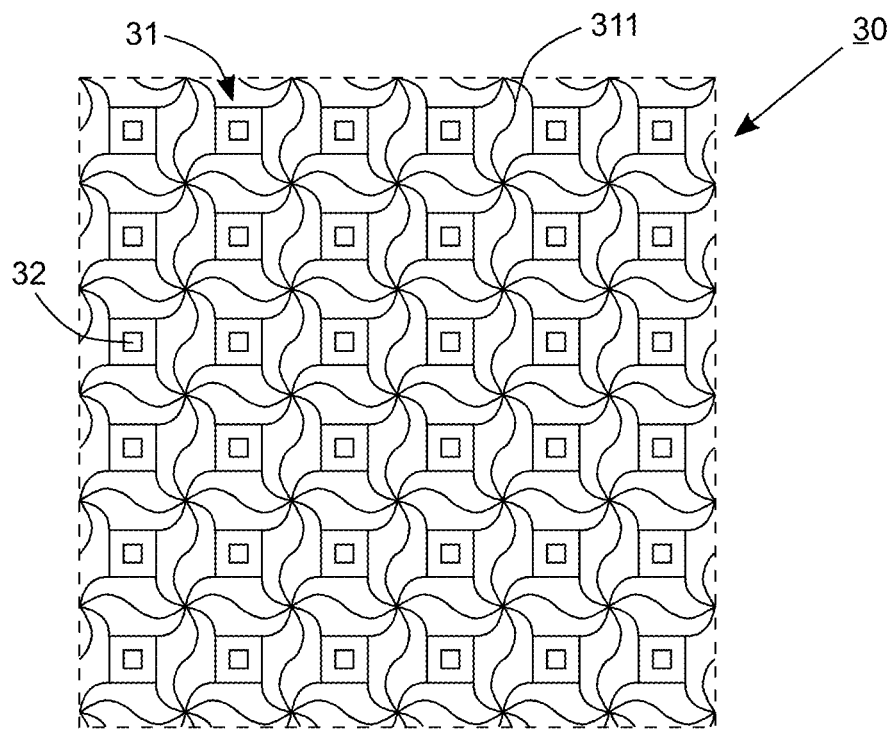
FIG. 7 schematically shows a fourth embodiment of a reflector of a display device according to the disclosure.

FIG. 7 schematically shows a fourth embodiment of a reflector 30 of a display device according to the disclosure. In this embodiment, the upper edges 311 of the cavities 31 as viewed by the observer have a curved profile. In this case, the cavities 31 are nested in one another like a puzzle. Possibly with the exception of an edge region of the reflector 30, all cavities 31 have the same shape in this example. Moreover, the light sources 32 are arranged in a regular dot matrix. However, since no straight lines occur, the regular grid structure of the reflector 30 is also broken up in this case.

Figure 8:
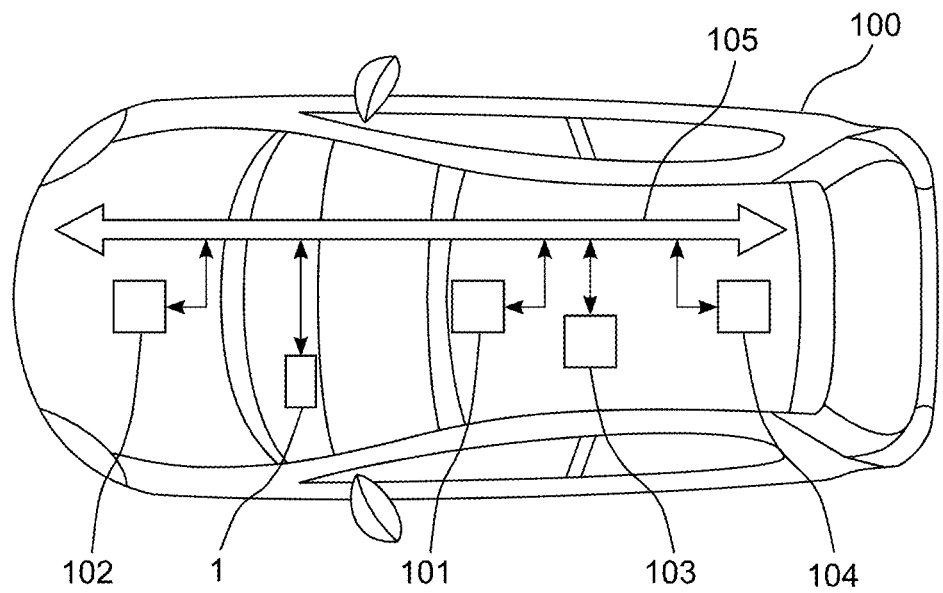
FIG. 8 schematically shows a means of transportation that utilizes a display device according to the disclosure.

FIG. 8 schematically shows a means of transportation 100 that utilizes a display device 1 according to the disclosure. The means of transportation 100 is a motor vehicle in this example. The motor vehicle comprises a display device 1 according to the disclosure, which is arranged in a dashboard. Data concerning the vehicle surroundings may be acquired by a sensor system 101. The sensor system 101 may comprise in particular surrounding recognition sensors, for example ultrasonic sensors, laser scanners, radar sensors, lidar sensors, or cameras. The information acquired by the sensor system 101 may be used to generate contents to be displayed for the display device 1. Further parts of the motor vehicle in this example are a navigation system 102, by which positional information may be provided, and also a data transfer unit 103. By way of example, a connection to a backend, for example for receiving updated software for components of the motor vehicle, may be established by means of the data transfer unit 103. A memory 104 is present for storing data. Data are exchanged between the various components of the motor vehicle via a network 105.

The invention claimed is:

1. A display device comprising a display panel and a backlight for the display panel, the backlight comprising:
   a reflector having a multiplicity of reflectively configured cavities, with walls of the cavities being configured such that a grid structure of the reflector resulting from the arrangement of the cavities is broken up, wherein upper edges of the cavities as viewed by an observer form irregular pentagons, hexagons, or a curved profile; and
   a multiplicity of light sources arranged in each case in the cavities.

2. The display device as claimed in claim 1, wherein adjacent cavities each have a different configuration.

3. The display device as claimed in claim 1, wherein the cavities are nested in one another.

4. The display device as claimed in claim 1, wherein the light sources have a regular arrangement.

5. The display device as claimed in claim 1, wherein the walls of the cavities are rounded and the cavities are configured to reflect the light emitted by the light sources toward the display panel.

6. The display device as claimed in claim 5, wherein the light sources are side-emitting light-emitting diodes.

7. The display device as claimed in claim 6, wherein the side-emitting light-emitting diodes emit light on all sides.

8. A motor vehicle comprising a display device comprising a display panel and a backlight for the display panel, the backlight comprising:
   a reflector having a multiplicity of reflectively configured cavities, with walls of the cavities being configured such that a grid structure of the reflector resulting from the arrangement of the cavities is broken up, wherein upper edges of the cavities as viewed by an observer form irregular pentagons, hexagons, or a curved profile; and
   a multiplicity of light sources arranged in each case in the cavities.

* * * * *